March 21, 1961

C. PRESGRAVE 2,975,897

MAGNETIC METHOD FOR REMOVAL OF FINELY DIVIDED MAGNETIC MATERIALS

Filed Nov. 30, 1959

INVENTOR:
CYRIL PRESGRAVE
BY
Howson & Howson
ATTYS.

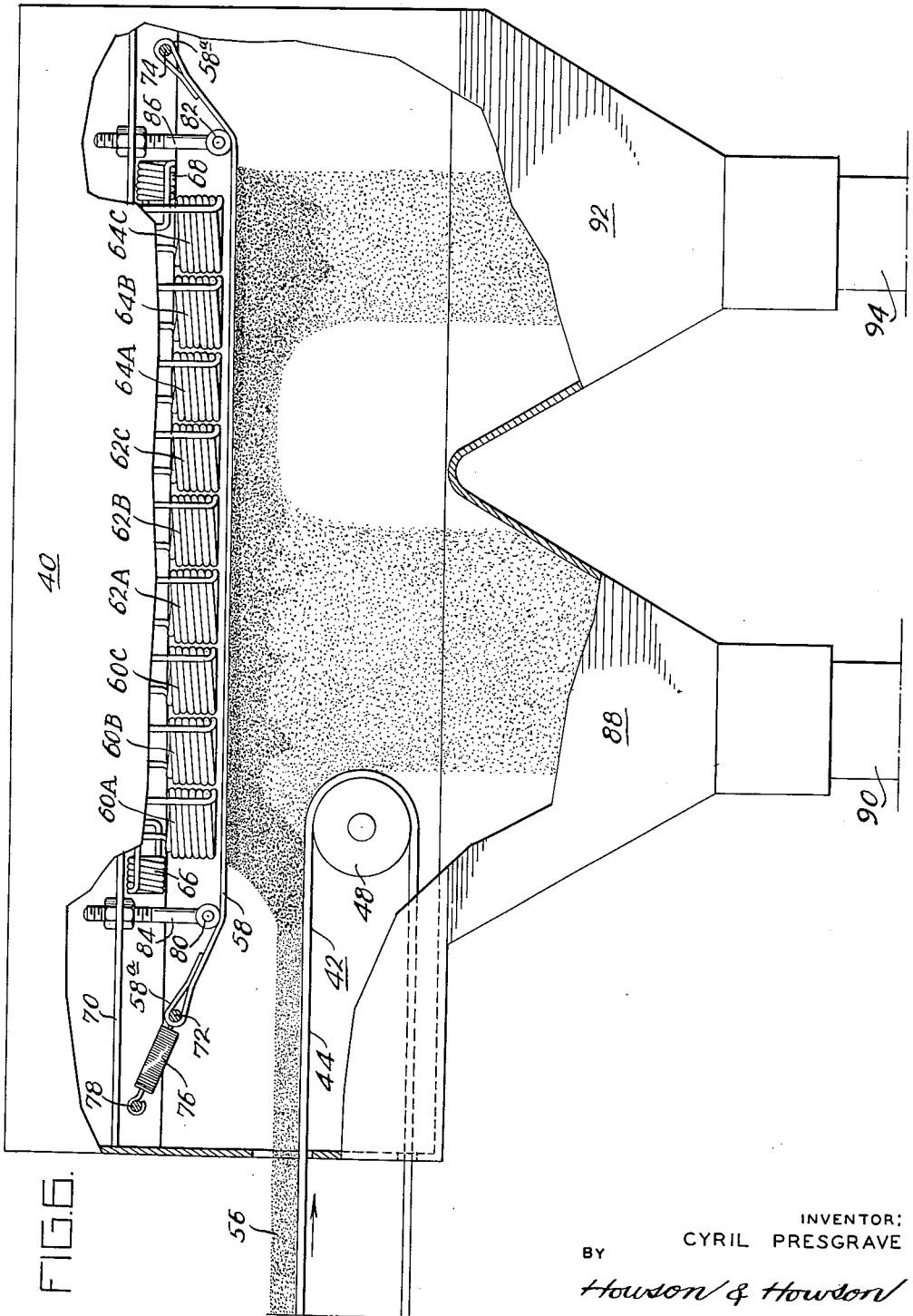

March 21, 1961  C. PRESGRAVE  2,975,897
MAGNETIC METHOD FOR REMOVAL OF FINELY
DIVIDED MAGNETIC MATERIALS
Filed Nov. 30, 1959  3 Sheets-Sheet 3

INVENTOR:
CYRIL PRESGRAVE
BY
Howson & Howson
ATTYS.

United States Patent Office 2,975,897
Patented Mar. 21, 1961

2,975,897

MAGNETIC METHOD FOR REMOVAL OF FINELY DIVIDED MAGNETIC MATERIALS

Cyril Presgrave, Gwynedd Valley, Pa., assignor to G. & W. H. Carson, Incorporated, Plymouth Meeting, Pa., a corporation of Pennsylvania Filed Nov. 30, 1959, Ser. No. 856,300

13 Claims. (Cl. 209—214)

This application is a continuation-in-part of my application Serial No. 672,391, filed July 17, 1957, and now abandoned.

This invention relates to a method for the magnetic separation of finely divided non-magnetic particles from a mixture comprising finely divided ferromagnetic and non-magnetic particles. More particularly, the invention relates to a method for treating a substantially dry mixture of finely divided non-magnetic and ferromagnetic particles to effect their separation in which a magnetic field of certain defined characteristics spins the magnetic particles with an angular velocity which, upon collision of the magnetic particles with each other and non-magnetic particles, establishes within at least a portion of the mixture an expanded state in which the particles are in turbulent motion, the linear velocity of the non-magnetic particles carrying them beyond and away from the magnetic particles which are retained within the magnetic field.

This invention also relates to a novel method for the separation of finely divided non-magnetic particles from ferromagnetic particles of fly ash.

The separation of one substance from another substance by means of a magnetic field, commonly referred to as magnetic separation, is well known, and many highly specialized methods and machines have been developed for making such separations. The method selected for making a particular separation generally depends upon such factors as whether the magnetic substance present in the material to be treated is strongly or weakly magnetic, whether the magnetic substance forms a relatively large or small portion of the feed material, the particle size and size gradient of the material, and the like. For example, dry magnetic separation methods are most frequently resorted to with feeds in which the magnetic substance is moderately too strongly magnetic, and finely-divided particles, e.g. particles on the order of 200 mesh and smaller, are not present. Such dry separations may be accomplished by means of magnetic pulleys, magnets suspended over moving belts or inclined shutes, and rotary separators. In belt machines, the raw material is fed into the machine on a belt and under successive magnets and cross belts run under the magnets and above the feed belt. The magnetic material is lifted against the force of gravity and adheres to the under side of the cross belts, which carry it laterally out of the field of the magnets. In another type of magnetic separator, a raw material containing magnetic particles is fed into a magnetic field so that the magnetic particles are suspended against an overhanging nonmagnetic surface. The magnetic particles, in the form of a dense mass of particles against the non-magnetic surface are caused to turn end over end along the surface, as for example by changing the polarity of the magnetic means behind the non-magnetic surface. Due to this agitation of the magnetic particles, the non-magnetic constituents in the feed are caused to fall away from the non-magnetic surface by the force of gravity.

Although the above-described dry separation methods provide for relatively efficient separation of a magnetic substance from a feed material comprised of coarse-sized particles substantially free of finely divided particles, they produce a relatively poor separation where the feed material contains appreciable amounts of finely divided particles, such as particles having a particle size on the order of 200 mesh or less. For example, such dry magnetic separation methods have been used for the separation of magnetite from gangue, but, because of the tendency of finely divided non-magnetic gangue to become physically entrained between strongly polarized ferromagnetic particles, their application for this purpose has been superseded by wet magnetic separation methods.

Although finely divided materials may be separated by wet magnetic separation methods, such methods have a number of inherent disadvantages. In many instances it is desired that the material recovered, whether magnetic or non-magnetic, be in a dry form in order to be suitable for the specific use for which it is obtained, or because the recovered material must be shipped from the point of separation to another location, and the shipment of a wet material, due to its considerable moisture content, represents prohibitive shipping and handling costs. Thus, the provision of a dry product obtained by wet magnetic separation methods involves an additional expense in the way of drying equipment and heating and additional handling costs. Furthermore, the fluid medium, such as water, in which the separation is effected, may have a deleterious effect on certain desirable properties of the material recovered.

A primary object of this invention is to provide a direct and inexpensive method for magnetic separation of finely divided non-magnetic particles from a mixture thereof with finely divided ferromagnetic particles.

Another object of the invention is the provision of a method in which a novel particle agitation establishes a basis for substantially dry mechanical separation of non-magnetic and ferromagnetic particles whereby substantially increased separation rates and products of a higher degree of purity are obtained.

A further object of this invention is the provision of an improved method for treating a substantially dry mixture of finely divided non-magnetic and magnetic particles to effect rapid and substantially complete separation thereof in which a magnetic field having rotating magnetic components establishes a high degree of turbulence in the mixture of particles by which non-magnetic particles are forcefully ejected from the magnetic field while the magnetic particles are retained therein.

Still another object of this invention is to provide a substantially dry magnetic separation method for separating finely divided solids which is readily adapted to a high degree of automation so that several machines embodying the method can be managed easily by a single operator-maintenance man without interrupting a high rate of production or affecting the quality of the product in any way.

Yet another object of this invention is the provision of a relatively inexpensive method for the rapid magnetic separation of substantially dry finely divided ferromagnetic and non-magnetic particles from fly ash by means of a novel particle agitation.

These and other objects of this invention will become clearly apparent from a consideration of this specification, claims and accompanying drawings, in which:

Fig. 6 is an enlarged side elevational view, partly in section, showing the magnetic separation means of the apparatus of Figs. 4 and 5.

Figure 1:
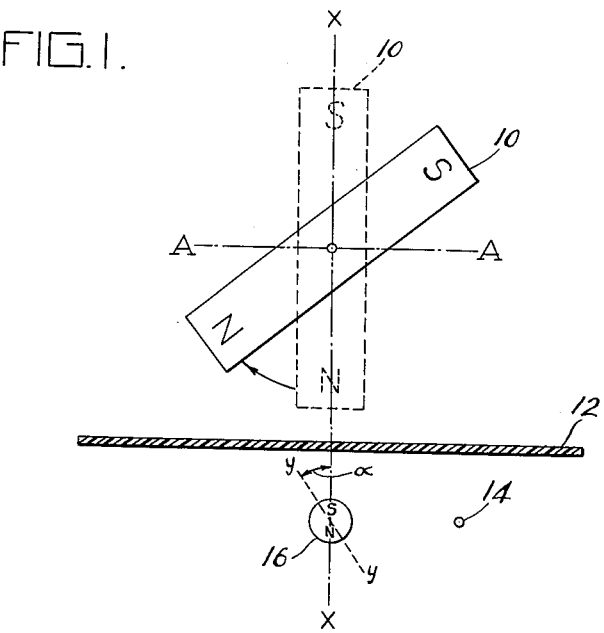
Fig. 1 is a schematic diagram illustrating the particle separation method of this invention in which the magnetic field is established by means of a rotating permanent bar magnet.

According to this invention there is provided a novel method for treating a substantially dry mixture of finely divided non-magnetic and ferromagnetic particles, substantially all of which particles have a particle size below about 100 mesh (Tyler), to separate non-magnetic particles from ferromagnetic particles, which comprises introducing the mixture to a magnetic field which decreases in mean field intensity with distance from a region of maximum field intensity. Substantially each point in at least a portion of the magnetic field varies in direction with time, the variation in direction comprising a magnetic component rotating about each point. The rotating magnetic component spins the ferromagnetic particles with an angular velocity which, upon collison of the ferromagnetic particles with each other and non-magnetic particles, establishes within at least a portion of the mixture an expanded state in which the distance between the particles is great as compared to the size of the particles, and the particles are in turbulent motion. The linear velocity of the non-magnetic particles carries them beyond and away from the magnetic particles which are retained in the magnetic field by the change in field intensity with distance. The non-magnetic and magnetic particles are thereafter separately recovered.

Preferably, the mean field intensity in the region of maximum field intensity is from about 40 to about 80 percent of the magnetic force necessary for magnetic saturation of the ferromagnetic particles, and the decrease in mean intensity with distance from the region of maximum field intensity is from about 1 to about 5 webers per square meter per meter. Also, a mean speed of rotation for the rotating magnetic components of the field of from about 300 to about 4000 radians per second is preferred.

As stated previously, the prior known dry magnetic separation methods produce a relatively poor separation at low production rates where the feed material contains appreciable amounts of finely divided particles, such as particles having a particle size on the order of about 200 mesh or less. For example in the prior method wherein a raw material containing magnetic particles is fed into a magnetic field so that the magnetic particles are suspended against an overhanging non-magnetic surface or shield, and the magnetic particles, in the form of a dense mass of particles, are caused to turn end over end along the shield, as for example by changing the polarity of the magnetic means behind the shield, and non-magnetic particles fall away from the shield due to the force of gravity, production rates are slow, being to a large extent limited by the force of gravity, and separation is extremely poor because of the tendency of finely divided non-magnetic particles to become physically entrained between strongly polarized magnetic particles. It has now been found that by providing a finely divided, substantially dry, raw material containing ferromagnetic particles with a novel agitation by means of a particular type of magnetic field, more fully described hereinafter, dry separation of a mixture of finely divided particles, a substantial portion or all of which have a particle size below about 200 mesh, can be carried out rapidly to produce products of exceptionally high purity. Where heretofore separation of finely divided particles could be effected to any satisfactory degree only by wet methods, through the method of this invention the disadvantages of wet methods, such as additional handling and drying of the product, are now obviated.

As stated above, the magnetic field employed according to this invention at substantially each point in at least a portion of the field varies in direction with time and the variation in direction comprises a magnetic component rotating about each point. Referring to Fig. 1 there is illustrated therein a permanent bar magnet 10 which is suspended above a non-magnetic surface or shield 12. If magnet 10 is rotated about the axis A—A in a clockwise direction, as indicated by the arrow, the magnetic field below non-magnetic shield 12 will vary in direction with time, the rate of variation depending upon the rate of rotation of magnet 10. If any point is selected at random in the magnetic field below shield 12, as for example point 14, the lines of flux passing through the point will vary in direction as the magnet rotates. This variation in direction of the lines of flux will comprise a magnetic component rotating about point 14, or any other point in the magnetic field.

If a ferromagnetic particle, such as particle 16, is placed in the magnetic field created by rotating bar magnet 10, Fig. 1, a torque is produced in the particle by the rotating magnetic component. Although there is no intention to be bound thereby, it is believed that the phenomenon involved is substantially the same as that employed in the hysteresis type of synchronous motor. Particle 16, if it has to some degree ferromagnetic properties, although it need not be a conductor of electricity, will possess induced magnetism from the magnetic field, and may be assumed to have north and south poles as indicated. When magnet 10 is in the position indicated by the dotted lines, so that its longitudinal axis lies along the axis x—x with its north pole adjacent non-magnetic shield 12, ferromagnetic particles 16 also has its north and south poles lying along the axis x—x. As magnet 10 rotates in a clockwise direction to the position indicated, the magnetic components rotating about the point where particle 16 is located create a torque which tends to give the particle an angular acceleration in a direction opposite to the direction of rotation of magnet 10, or in a counter clockwise direction. The reason for this is that as the magnetic field varies in direction with time, the induced magnetism of the particle lags in angular position because of the hysteresis properties of the substance of which the particle is composed. This lag in angular position is indicated by the angle between the axis x—x and axis y—y. When the opposing forces, as for example frictional forces, permit, the particle will come into synchronous rotation with the rotating magnet.

Figure 2:
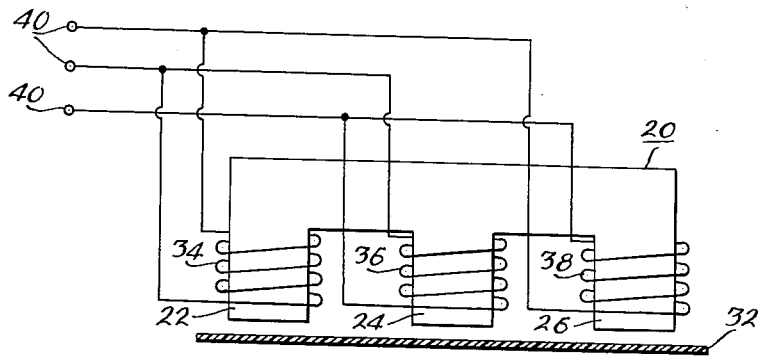
Fig. 2 is a schematic diagram illustrating the particle separation method of this invention in which the magnetic field is established by electromagnetic means energized by a polyphase electrical circuit.
Figure 3:
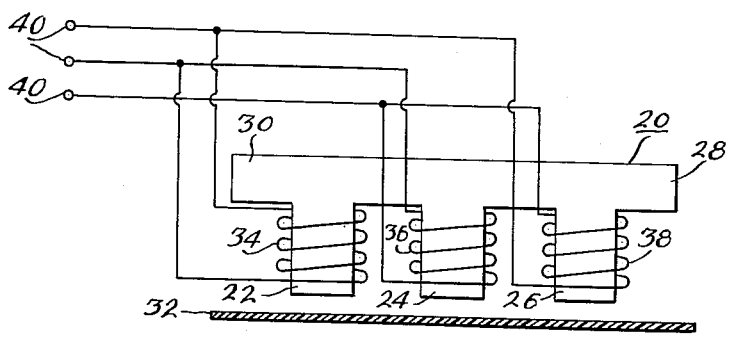
Fig. 3 is a schematic diagram similar to that of Fig. 2, of another form of electromagnetic means suitable for use in the magnetic separation method of this invention.

In Figs. 2 and 3, a magnetic field of the type described with reference to Fig. 1, i.e., a field that varies in direction with time, is produced by electromagnetic means comprising an iron core 20 composed of thin laminations clamped together in any suitable manner well known in the art. In both figures, iron core 20 is provided with spaced apart, vertically extending pole pieces 22, 24 and 26, which terminate a short distance above a non-magnetic surface or shield 32. The iron core illustrated in Fig. 3 is also provided with horizontally extending end pole pieces 28 and 30, whose function will be more fully discussed hereinafter. Surrounding pole pieces 22, 24 and 26 are windings 34, 36 and 38, respectively, which are delta-connected to lead wires 40 of a 3 phase alternating current source, e.g. a 3 phase, 60 cycle, 30 volt generator. The phase angle between coils 34, 36 and 38, Figs. 2 and 3, is 120°; however, polyphase circuits in conjunction with a suitable number of pole pieces, lend themselves to the use of various phase angles between pole coils, as for example 90°, 60°, 30° and the like.

The field pattern produced by the electromagnetic means illustrated in Figs. 2 and 3 is rather complex, varying considerably in intensity from point to point, for the pole pieces are continually changing in polarity and coercive force. At any given point in the field below shield 28, the field will have a magnetic component which rotates. In addition there may be a magnetic component which merely alternates back and forth in a given direction. However, the effect on a ferromagnetic particle therein is similar to that produced by the magnetic field of Fig. 1, at least as far as the ability of such a magnetic field to rotate a ferromagnetic particle is concerned.

When a mixture of finely divided ferromagnetic and nonmagnetic particles is introduced into a magnetic field, which varies in direction with time, as for example a field created by the magnetic means illustrated in Figs. 1–3, the rotating magnetic component of the field tends to spin each of the magnetic particles. It is believed that if the speed of rotation of the magnetic component is not too high, the magnetic particles are brought into synchronous rotation in a relatively short period of time. However, whether the rotation of the several ferromagnetic particles is actually synchronous or not has not been determined.

The novel agitation of the particles according to the dry magnetic separation method of this invention is directly related to the rotation of the ferromagnetic particles. Upon collision of magnetic particles with each other and with nonmagnetic particles in the magnetic field, the angular velocity of the ferromagnetic particles is converted, at least in part, to translational motion. As a spinning ferromagnetic particle comes into contact with another particle, the frictional force between the particles sends them in opposite directions and simultaneously slows the rotation of the ferromagnetic particle. The rotating magnetic component of the magnetic field, however, quickly accelerates the spin of the ferromagnetic particle back into synchronization. As a result of collisions of spinning ferromagnetic particles with each other and with non-magnetic particles and also collisions between the latter, and the exchange of momentum between particles, the entire mass of particles is thrown into violent and chaotic motion in which the motion of the particles, in a sense, may be said to be similar to the motion of molecules in a gas. In other words, the mixture of particles is in an expanded state in which the distance between particles is great as compared to the size of the particles, and the particles are in turbulent motion.

In the magnetic field, however, there is an opposing process by which the particles in an expanded state tend to densify, i.e. the expanded mass of particles tends to collapse or "liquefy." It appears that the induced magnetism of the ferromagnetic particles tends to make them form ribbons in the direction of the field, and adjacent ribbons tend to repel each other sideways. Thus, the condensed mass of particles formed according to this phenomenon has different properties in the direction of the magnetic field from those in a direction transverse to the magnetic field. By analogy, the condensed mass of particles may be considered an "anisotropic liquid." Such opposing process has a disadvantage in that non-magnetic particles tend to be imprisoned between magnetic particles. In order to prevent formation of these ribbons of ferromagnetic particles, those ferromagnetic particles which are free must have a large angular velocity, which may be attained for example by having the rotating magnetic components of the field rotating at a sufficiently high speed, and by further reducing the concentration of the ferromagnetic particles in the magnetic field.

In addition to providing a magnetic field which creates an expanded state within the mass of particles, the field must also act as a selective filter which permits non-magnetic particles to leave the field, but restrains the ferromagnetic particles from leaving the field. This is essential, for when the mass of particles has, in a sense, been "gasified," the random motion of the particles tends to make them diffuse outward from the magnetic means; in other words, the mass of particles tends to continually expand. Selective filtering of particles is obtained by providing a magnetic field, which, in addition to varying in direction with time, decreases in mean field intensity with distance from a region of maximum intensity. Referring to Figs. 1–3, it can be seen that the region of maximum field intensity will be at the surface of non-magnetic shields 12 and 32, and that the magnetic fields created by the magnetic means illustrated will decrease in intensity with distance from the shield. This decrease in magnetic field intensity with distance, or field gradient, produces a force on the ferromagnetic particles which urges them toward the region of high field intensity; thus, the decrease in field intensity with distance provides, in a sense, a confined zone for the ferromagnetic particles only the boundaries of which are completely permeable to the non-magnetic particles. The non-magnetic particles, due to their high linear velocity, are forcefully ejected through the walls or boundaries of the zone while the ferromagnetic particles are retained therein.

One wall or boundary of the zone is, of course, the magnetic means itself, or preferably a non-magnetic shield, such as those illustrated in Figs. 1–3. At some portions of this wall, the magnetic field gradient may be relatively high, and the resulting pressure on the magnetic particles may tend to make them "condense" on this wall. Although a small amount of such "condensation" of the particles, as compared to the total mass of particles, is not objectionable, at least a substantial portion of the particles, for example at least about 30 percent, by weight, of the particles in the field, should be in the above-described expanded state and should have sufficient momentum to prevent "condensation" from becoming too severe. Otherwise, the efficiency of separation will be markedly decreased.

While the theoretical discussions of this invention set forth herein above are believed to be correct, there is no intent to be bound thereby; nevertheless, by means of the novel particle agitation according to the magnetic separation method of this invention the degree of separation of finely divided particles is great, with the provision of ferromagnetic and non-magnetic products of high purity. Furthermore, the rate of separation according to this invention is not limited, as in many prior methods, by the force of gravity, for forces many times that of gravity are provided to forcefully eject the non-magnetic particles from their original association with ferromagnetic particles. Thus, performance efficiency and rate of production according to this invention are not limited except by the capacity of the magnetic means employed. Of course, for a certain magnetic means which produces a relatively pure product at one rate of throughput, if the rate of throughput is doubled or tripled, purity of product will decrease accordingly. Nevertheless, by suitable processing controls, as for example recycle of part of the products, maintenance of proper concentration of solids in the magnetic field and the like, rapid production of high purity products may be obtained.

The separation medium in which the finely divided particle separation is effected according to the method of this invention should be substantially gaseous. Thus, the separation may be carried out in the presence of atmospheric air or in special atmospheres, as for example steam or polar gases such as ammonia. A small amount of liquid phase moisture, for example 5–10%, may be dispersed in such a gaseous atmosphere with substantially no adverse effect on the efficiency of separation. In addition to ordinary atmospheric pressure, both super- and sub-atmospheric pressures, preferably the latter, may be employed. Also, such gaseous medium may be utilized to aid in conveying ferromagnetic particles from the point of introduction of a raw particulate feed into the magnetic field to a collection point, which procedure will be more fully discussed hereinafter.

In providing the novel particle agitation according to the method of this invention, certain operating parameters for the magnetic field should be employed. As stated previously, substantially each point in at least a portion of the magnetic field varies in direction with time, the variation in direction comprising a magnetic component rotating about each point. It has been found that a mean speed of rotation for rotating magnetic components of at least about 150 radians per second is essential to spin the ferromagnetic particles with an angular velocity which, upon collision of the ferromagnetic particles with each other and with non-magnetic particles, establishes within at least a portion of the mixture of particles an expanded state in which the distance between particles is great as compared to the size of the particles and in which expanded state the particles are in turbulent motion. If substantially lower speeds of rotation are employed, the mass of particles will tend to condense to such a degree, with the formation of chains of ferromagnetic particles, that efficiency of separation will be greatly reduced. Generally, the spinning magnetic components should rotate at a mean speed of from about 150 to about 10,000 radians per second, and preferably from about 300 to 4000 radians per second.

Maximum field intensity is another factor which must be considered in providing the novel particle agitation of this invention. It has been found that in the region of maximum field intensity, the mean maximum field intensity should be less than about 2 webers per square meter, but at least as great as about 20 percent of the mean coercive force of the ferromagnetic particles to be separated, i.e. the coercive force associated with residual magnetism of the ferromagnetic particles. Preferably, the magnetic field has a mean maximum intensity of from about 40 to about 80 percent of the magnetic force necessary for magnetic saturation of the ferromagnetic particles. If the mean maximum field intensity is substantially less or substantially exceeds the above values, "condensation" of the particles or expulsion of ferromagnetic particles from the field may occur.

The magnetic field must also define walls or boundaries which confine the ferromagnetic particles, but which are permeable to the non-magnetic particles. This condition is obtained by providing the magnetic field with a field gradient so that the field decreases in mean intensity with distance from a region of maximum intensity. By providing a mean field gradient of from about 0.3 to about 40 webers per square meter per meter, a confined zone of "container" which retains the ferromagnetic particles, but which permits non-magnetic particles to be ejected therefrom may be established. Preferably a field gradient of about 1 to about 5 webers per square meter per meter is employed.

According to the preferred form of carrying out the method of this invention, as the values of mean maximum field intensity and mean field gradient are increased, speed of rotation of magnetic components is likewise increased. The reason for this is that if the field has a high field gradient there will be greater tendency for an increasing portion of the particles to condense if the speed of rotation is relatively low. Also, if the field gradient has a relatively low value, very high speeds of rotation may tend to eject ferromagnetic particles from the field along with non-magnetic particles. By observing the condition of the particles and by determining the quality of the product, adjustments in operating conditions readily may be made in order to obtain optimum results with a given magnetic separator embodying the process.

In the above discussion of the magnetic field and in the claims, the expressions "mean maximum field intensity," "decrease in mean field intensity," "mean speed of rotation" and "mean coercive force" (of the ferromagnetic particles) are employed. It is clear that in a complex magnetic field, such as that produced by the electromagnetic means illustrated in Figs. 2 and 3, the field will vary to some degree from point to point in such values as maximum field intensity, speed of rotation and the like. Thus, in establishing the operating parameters of the field, mean values have been set forth, although it is clear that values, as for example values of maximum field intensity, both greater and less than the mean values set forth may exist in the field. Also, with regard to the coercive force of the particles, mean values are selected since ferromagnetic particles may show variations in magnetic properties.

The magnetic field employed in the magnetic separation method of this invention may be provided by various mechanical arrangements involving magnetic means. For example, the magnetic means may comprise one or more rotating permanent magnets (Fig. 1) or electromagnets. Also, and preferably, the magnetic field may be produced by the use of polyphase circuits (Figs. 2–3) so that the magnets themselves will not be required to move. The coils of stationary magnets may be connected to polyphase circuits according to various well known electrical arrangements, typical of which are Y- and delta-connected coils, and by providing a suitable number of poles, various phase angles, such as 120°, 90°, 60°, 30°, etc., may be provided between the pole coils. Figs. 2 and 3 illustrate delta-connected pole coils having a phase angle of 120°.

The direction and pattern of the magnetic field may be subject to numerous variations, and the field may be distorted by mechanical movement of the magnets or by either stationary or moving superimposed magnetic influences. In Fig. 3, for example, the electromagnetic means illustrated is provided with end pole pieces 28 and 30, which may be provided with suitable coils, not shown. Pole pieces 28 and 30 may be energized in such fashion as to establish a flux return path consistent with the magnetic field thereby providing an electrically balanced, more efficient system. Such an arrangement also reduces the tendency of ferromagnetic particles to concentrate at either pole piece 22 or 26. This arrangement of pole pieces is particularly advantageous for use in continuous separation according to this invention, as will be more fully described with reference to Figs. 4–6.

The polyphase energized magnetic means schematically illustrated in Figs. 2–3 require an uneconomical reactive load. However, by means of suitable capacitors, synchronous machines, and the like, the bulk of the wattless load may be economically absorbed. Such electrical arrangements will be apparent in the light of the teachings herein, to those skilled in the art and need not be described in greater detail herein.

The method of this invention may be carried out as a batch operation or continuously. In a batch operation the raw finely divided material may be placed in a separation zone provided with a magnetic field as heretofore described. The magnetic field establishes in the finely divided material an expanded state and non-magnetic particles are forcefully ejected from the magnetic field. The non-magnetic particles may then be removed from the separation zone by mechanical means or by fluid means, as for example by passing a stream of air through the separation zone. The gas stream, of course, should not interfere with the novel particle agitation created by the magnetic field.

The magnetic field having rotating magnetic components is readily adaptable to continuous separation of particulate materials. The reason for this is that the ferromagnetic particles describe a net spin or rotation in a single direction due to the rotating magnetic components of the magnetic field. Upon collision of the particles with the non-magnetic shield, due to their net spin in a single direction, the mass movement of the particles will be in a single direction through the magnetic field. Thus, the rotating magnetic components may cause the ferromagnetic particles, due to their net rotation in a single direction, to move away from the point of introduction of the raw feed to the magnetic field, and the particles will collect in the vicinity of the pole piece furthest removed from the point of introduction. The ferromagnetic particles will then fall from the magnetic field due to the weight of the mass of particles so collected. The time of transportation of ferromagnetic particles through the magnetic field, however, should be sufficient for the ferromagnetic particles to purge themselves of adhering or occluded non-magnetic particles prior to reaching the region of the pole piece furthest removed from the point of introduction of the raw particulate feed. This mass movement of the ferromagnetic particles can be aided, as for example, by a gaseous stream or by having the non-magnetic shield move in the direction of the net movement of the ferromagnetic particles, and the tendency of the ferromagnetic particles to collect in the region of the last pole piece can thereby be overcome. Of course, any means employed to aid in such mass movement of the ferromagnetic particles should not interfere with the novel particle agitation created by the magnetic field. A typical continuous separation operation will be described more fully with reference to Figs. 4–6.

Figure 4:
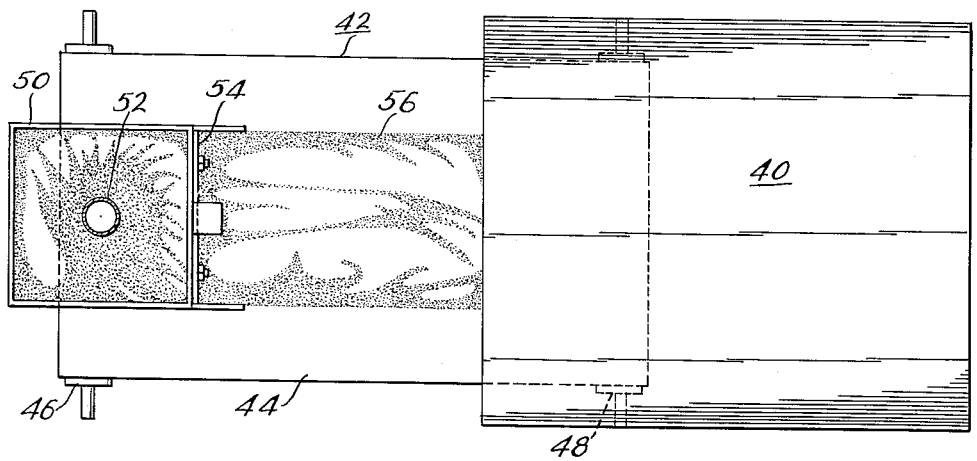
Fig. 4 is a plan view from above of apparatus embodying the particle separation method of the invention, the apparatus being illustrated somewhat schematically.
Figure 5:
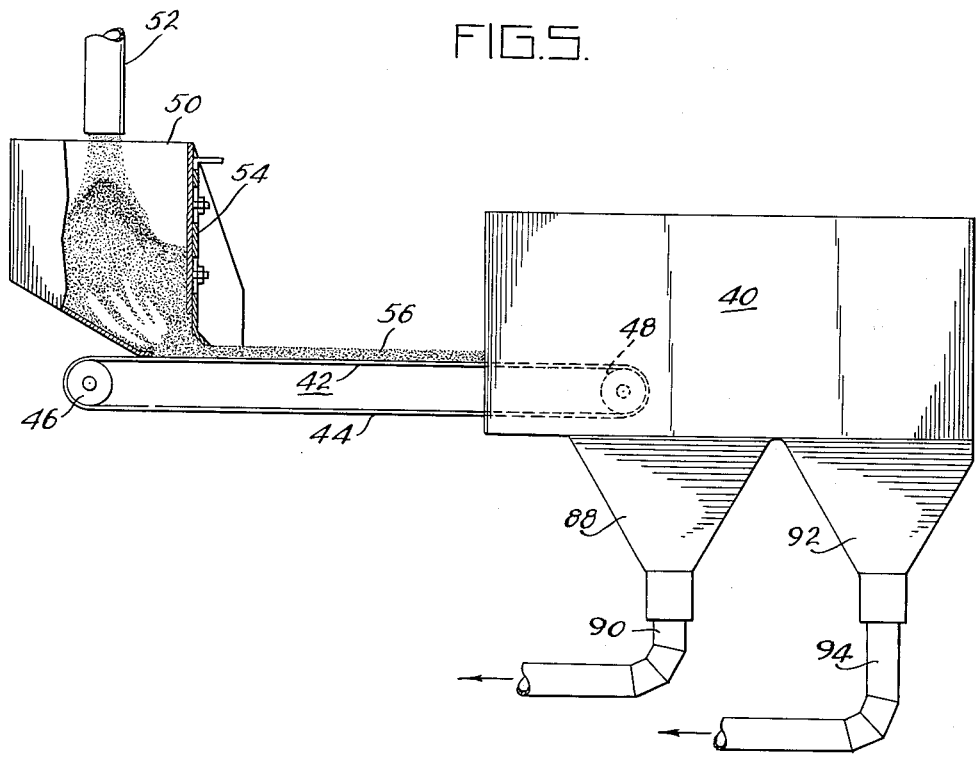
Fig. 5 is a side elevational view, showing the apparatus of Fig. 4.

Referring to Figs. 4–6, the magnetic means generally designated 40 is shown arranged with a housing. The magnetic means is arranged above and at the end of a conveyor 42 which preferably consists of a continuous belt 44 which extends over rollers 46 and 48, at least one of which is driven.

The finely divided raw material containing ferromagnetic particles is fed into a hopper 50 by any suitable feed arrangement, such as duct 52. The hopper is located with its bottom just above the belt and is provided with an adjustable gate 54 which may be adjusted to permit a varying amount of the mixture to flow onto the belt, the rate depending upon the capacity of the machine and the quality or purity of the ferromagnetic and non-magnetic fractions desired.

As may be seen in Fig. 4, the hopper feeds a band of material 56 onto the conveyor. Referring more particularly Fig. 6, as the raw feed passes into magnetic means 40, the feed is lifted by means of the magnetic fraction toward the bottom surface of a non-magnetic shield or barrier 58 by the magnetic field produced by magnetic means consisting of 9 adjacent pole pieces 60A, 60B, 60C, 62A, 62B, 62C, 64A, 64B, 64C, and two end pole pieces 66 and 68. The pole pieces may each be made of an iron core composed of thin laminations which may be clamped between a pair of spaced supporting brackets 70, only one of which is shown, which advantageously are angle members forming a portion of the supporting frame of the magnetic means. Each of the pole pieces are surrounded by insulated coils which preferably comprise insulated conductive tubing through which passes a suitable cooling fluid. For a phase angle of 120° between poles, the pole pieces with "A" designations are connected in series; those with "B" designations are connected in series; and those with "C" designations are also connected in series. Each series of pole pieces is delta- or Y-connected to a 3 phase power source. Preferably, capacitors or the like are used as a power factor correction means whereby a considerable saving in cost of operation of the magnetic means is effected. End pole pieces 66 and 68 are also provided with coils and serve the function of providing a flux return path consistent with the magnetic field and preventing a build up of ferromagnetic particles at pole pieces toward either end of the magnetic means.

The surface or barrier between the region in which separation occurs and the magnetic means is provided by a sheet 58 of some non-magnetic material, such as Bakelite or the like, which is supported on the same frame brackets 70 which support the magnetic cores. The sheet 58 has its edges terminated in a loop 58A through which pass rods 72 and 74. Rod 74 extends between the frame brackets 70 whereas rod 72 is supported by a pair of spring members 76, only one of which is shown, which, in turn, may be fixed to a rod 78 extending between the frame brackets 70. At each end of the pole structure and spaced some distance from the pole pieces 60A and 64C are support members 80 and 82 respectively. These supports are horizontal rods which bear a smooth tubular cover and the bottom surface of which extends below the bottom surface of the pole pieces a small distance. These members tend to hold the sheet member 58 taut to form a planar area between them due to the tensioning affect of springs 76. Rods 80 and 82 are supported at their respective ends by vertical bolt members 84 and 86, respectively and are connected to frame brackets 70 which hold the rods in their proper position relative to the pole pieces.

The magnetic field establishes within the mass of particles an expanded state in which the distance between particles is great as compared to the size of the particles and the particles are in turbulent motion. The non-magnetic particles, which are not acted upon by the magnetic field and which are given energy by collision with the spinning ferromagnetic particles and with each other, are mechanically ejected from the magnetic field and fall into trough 88. The material is conveyed away from the trough by a conduit 90 which may be exhausted under a vacuum. Meantime, the magnetic means conveys the magnetic fraction away from the point of introduction of the finely divided feed into the separation zone. This enables the particles, which are freed of non-magnetic particles to accumulate at the end of the magnetic means opposite the point of introduction of the raw material and fall into a collection trough 92. The ferromagnetic material is conveyed away from the trough 92 through a conduit 94 which may be exhausted under vacuum.

In Fig. 6, non-magnetic shield 58 is stationary; however, the shield may take the form of a moving belt, which moves through the magnetic field in a direction away from the raw feed introduction point, to aid in conveying the ferromagnetic particles through the magnetic field and to decrease the tendency of the ferromagnetic particles to collect in the region of pole piece 64C. Also, a gas stream may be employed for such purpose in conjunction with a stationary or moving non-magnetic shield.

From the above discussion it will be observed that feeding, separation and collection of the fractions can be almost completely automatic so that the only attendant required to run apparatus of the type described embodying the method of the present invention is one who acts as a maintenance man to see that the machine is in proper order.

As stated above, by the method of this invention finely divided ferromagnetic particles may be separated from a mixture thereof with non-magnetic particles. The size of the particles treated according to the method of this invention should all have a particle size below about 100 mesh and preferably a substantial proportion thereof, for example about 40 percent, by weight, thereof or more may have a particle size below about 200 mesh. The magnetic particles should be strongly magnetic or ferromagnetic.

The inclusion in a raw feed material of particles having a particle size substantially greater than 100 mesh may tend to interfere with the magnetic separation process; however, advantageously extremely small particles, for example particles having a particle size as small as a sub-micron size, may be included in such a feed without any adverse effect or purity of products and efficiency of separation. Advantageously, therefore, the magnetic separation method of this invention is designed to effect dry separation of ferromagnetic particles from non-magnetic particles where the particles may have an extremely small size.

There are a number of applications where the process of this invention may be employed. An example of one is the treatment of fly ash, which is a gray powdery substance resulting from the combustion of pulverized coal. This ash, which is separated from the entraining combustion gas stream by electrostatic precipitators and the like, has such fineness that 100% passes through a 16 mesh screen, in excess of 95 percent passes through a 100 mesh screen, and on the order of 75 percent or more passes through a 325 mesh screen. The particles passing a 325 mesh screen range downward in size to submicron size, or less than 1/25,000 in. Fly ash contains appreciable quantities of iron oxide in the form of crystals of a ferromagnetic spinel in sphere-like particles of a siliceous glass. The method of this invention may also be applied to separating ferromagnetic from non-magnetic fractions of other materials. For example, in many iron treating processes, dust collectors remove iron and other fine materials. By the method of this invention the iron oxide may be readily recovered or returned to the process. Also, in other instances where the non-magnetic fraction is the material desired to be recovered, as for example coke or other fuel, this non-magnetic fraction may be obtained for its full value by separation from magnetic constituents according to the method of this invention. For instance, in the production of sponge iron there are a number of products collected which contain both finely divided metallic iron and finely divided coke. By means of the method of this invention the coke and iron may be separated in sufficiently pure form for further use.

In considering the present invention it should be noticed that the degree of separation is far better than that achieved by prior dry magnetic separation methods operating on finely divided particulate material. Moreover, higher production rates can be achieved using the method of the present invention than was possible with prior art methods. The following examples of the method of this invention are given for the purpose of illustration only and are not intended to limit the scope of this invention in any way.

EXAMPLE I

Fly ash having a particle size less than 200 mesh and comprising about 18 percent, by weight, of ferromagnetic particles are fed at a rate of 2 tons per hour into a magnetic separator embodying the method of this invention and substantially similar in design to the separator illustrated in Figs. 4–6. The magnetic means employed in the separator comprised 9 poles, disposed in similar fashion to poles 60A—64C, Fig. 6, and the pole coils were delta connected to a 60 cycle, 90 volt, 3 phase electric power source so that the phase angle between poles was 120°. The magnetic field produced by this magnetic means had a mean maximum field intensity of 1 weber per square meter, a field gradient of 10 webers per square meter per meter, and the rotating magnetic components of the field had a mean speed of rotation of 377 radians per second.

The magnetic separator produced .31 ton of ferromagnetic fly ash particles per hour representing a yield of 90 percent of theoretical. The ferromagnetic fraction of fly ash so separated was analyzed and found to be substantially free from non-magnetic particles.

EXAMPLE II

Fly ash having a particle size less than 100 mesh and comprising about 11 percent, by weight, of ferromagnetic particles was fed at a rate of 3 tons per hour into a magnetic separator embodying the method of this invention and substantially similar in design to the separator illustrated in Figs. 4–6; however, the non-magnetic shield comprised a continuous belt which moved through the separator in a direction away from the point of introduction of the feed and aided in transporting the ferromagnetic fraction from the separation zone. The magnetic means used in the separator comprised 9 poles, disposed in similar fashion to poles 60A—64C, Fig. 6, and the pole coils were connected to a 360 cycle, 440 volt, 3 phase, electric power source so that the phase angle between poles was 60°. The magnetic field produced by this magnetic means had a mean maximum field intensity of .7 weber per square meter, a field gradient of 7 webers per square meter per meter, and the rotating magnetic components of the field had a mean speed of rotation of 2262 radians per second.

The magnetic separator produced a ferromagnetic fly ash fraction at a rate of .39 ton per hour representing a yield of 90% of theoretical. The ferromagnetic fraction so produced was substantially free from non-magnetic particles.

EXAMPLE III

Sponge iron (a strongly magnetic material) having a particle size less than 100 mesh and containing as an impurity 7%, by weight, of silicon dioxide is introduced to a magnetic separator embodying the method of this invention and generally similar in design to the separator illustrated in Figs. 4–6; however, the means for creating the magnetic field comprises six, rather than nine, poles, and the non-magnetic shield comprises a continuous belt which moves through the separator at a rate of 30 feet per minute in a direction away from the point of introduction of the feed. The six poles for creating the magnetic field are connected to a suitable 3 phase electric power source so that the phase angle between poles is 60°.

The magnetic field produced by the magnetic means has a mean maximum field intensity of 0.3 weber per square meter, of field gradient of one weber per square meter per meter, and the rotating magnetic components of the field have a mean speed of rotation of 7650 radians per second.

The magnetic separator reduces a silicon dioxide content of the sponge iron to 3%, by weight.

EXAMPLE IV

Fly ash produced by combustion of a high iron coal, and having a particle size less than 100 mesh and comprising about 26%, by weight, of iron, expressed as $Fe_2O_3$ (the ferromagnetic particles are moderately magnetic), is introduced to a magnetic separator embodying the method of this invention and generally similar in design to the separator illustrated in Figs. 4–6; however, the means for creating the magnetic field comprises six, rather than nine, poles, and the non-magnetic shield comprises a continuous belt which moves through the separator at a rate of 30 feet per minute in a direction away from the point of introduction of the feed. The six poles for creating the magnetic field are connected to a suitable 3 phase electric power source so that the phase angle between poles is 120°.

The magnetic field employed has a mean maximum field intensity of about 60% of the mean coercive force of the magnetic particles, a field gradient of 13 webers per square meter per meter, and the rotating magnetic components of the field having a mean speed of rotation of 2262 radians per second.

A magnetic fraction comprising 85%, by weight, of iron, expressed as $Fe_2O_3$ is obtained.

EXAMPLE V

A fly ash fraction, produced by fractionation of a raw fly ash obtained by combustion of a high iron coal, having a particle size less than 100 mesh and comprising about 50%, by weight, of iron, expressed as $Fe_2O_3$, (the ferromagnetic particles are moderately magnetic) is introduced to the magnetic separator described in Example IV.

The magnetic field employed has a mean maximum field intensity of about 60% of the mean coercive force of the magnetic particles, a field gradient of 13 webers per square meter per meter and the rotating magnetic components of the field have a mean speed of rotation of 2262 radians per second.

A magnetic fraction comprising 89%, by weight, of iron, expressed as $Fe_2O_3$, is obtained.

EXAMPLE VI

A fly ash fraction, produced by fractionation of a raw fly ash obtained by combustion of a high iron coal, having a particle size less than 100 mesh and comprising 70%, by weight, of iron, expressed as $Fe_2O_3$ (the ferromagnetic particles are moderately magnetic) is introduced to the magnetic separator of Example IV. In this example, however, the pole faces of the magnetic means form an angle with the non-magnetic belt so that the pole faces at that end of the apparatus at which the magnetic particles are discharged are farther away from the belt than the pole faces at the point of introduction of the feed to the separator.

The apparatus above described has a mean maximum field intensity of 0.7 weber per square meter at the point of introduction of the feed, which field intensity decreases with distance from the point of introduction of feed to 0.4 weber per square meter at the end of the apparatus at which the magnetic material is discharged. The field gradient created by this magnetic means likewise decreases with distance from the point of feed introduction from 13 to 7 webers per square meter per meter. The rotating magnetic components of the field have a means speed of rotation of 2262 radians per second.

The magnetic separator above described produces from the feed a magnetic fraction comprising 89%, by weight, of iron, expressed as $Fe_2O_3$.

EXAMPLE VII

Fly ash produced by combustion of a low iron coal and having a particle size below 100 mesh and comprising about 14%, by weight, of iron, expressed as $Fe_2O_3$ (the ferromagnetic particles are weakly magnetic), is introduced to the magnetic separator described in Example IV.

The magnetic field employed has a mean maximum field intensity of 1.4 webers per square meter, a field gradient of 26 webers per square meter per meter, and the rotating magnetic components of the field have a mean speed of rotation of 377 radians per second.

The magnetic separator produces from the feed a magnetic fraction comprising 62%, by weight, of iron, expressed as $Fe_2O_3$.

EXAMPLE VIII

A fly ash fraction, produced by fractionation of a raw fly ash obtained by combustion of a low iron coal, having a particle size below 100 mesh and comprising 30%, by weight, of iron, expressed as $Fe_2O_3$ (the ferromagnetic particles are weakly magnetic), is introduced to the magnetic separator described in Example IV.

The magnetic field employed has a mean maximum field intensity of 1.4 webers per square meter, a field gradient of 26 webers per square meter per meter, and the rotating magnetic components of the field have a mean speed of rotation of 377 radians per second.

The magnetic separator produces from the feed a magnetic fraction comprising 60%, by weight, of iron, expressed as $Fe_2O_3$.

EXAMPLE IX

A fly ash fraction, produced by fractionation of a raw fly ash obtained by combustion of a low iron coal, having a particle size less than 100 mesh and comprising 58%, by weight, of iron, expressed as $Fe_2O_3$ (the ferromagnetic particles are weakly magnetic), is introduced to the magnetic separator described in Example VI.

The apparatus employed has a mean maximum field intensity of 1.4 webers per square meter at the point of introduction of the feed, which field intensity decreases with distance from the point of introduction of the feed to 1.0 weber per square meter at the end of the apparatus at which the magnetic material is discharged. The field gradient created by this apparatus likewise decreases with distance from the point of feed introduction from 26 to 19 webers per square meter per meter. The rotating magnetic components of the field have a mean speed of rotation of 2262 radians per second.

The magnetic separator above described produces from the feed a magnetic fraction comprising 64%, by weight, of iron, expressed as $Fe_2O_3$.

EXAMPLE X

A titanium ore having a particle size less than 100 mesh and containing as in impurity 0.08%, by weight, of metallic iron particles (a strongly magnetic material), is introduced to the magnetic separator described in Example IV.

The magnetic field employed has a mean maximum field intensity of 0.7 weber per square meter, a field gradient of 13 webers per square meter per meter, and the rotating magnetic components of the field have a mean speed of rotation of 2262 radians per second.

The magnetic separator produces from the feed a titanium ore containing no measureable quantity of metallic iron impurities.

EXAMPLE XI

A titanium ore having a particle size less than 100 mesh and containing as an impurity 0.03%, by weight, of metallic iron particles (a strongly magnetic material) is introduced to the magnetic separator described in Example IV.

The magnetic field employed has a mean field intensity of 0.7 weber per square meter, a field gradient of 13 webers per square meter per meter, and the rotating magnetic components of the field have a mean speed of rotation of 2262 radians per second.

The magnetic separator above described produces from the feed a titanium ore containing no measurable quantity of metallic iron impurities.

EXAMPLE XII

A titanium ore having a particle size less than 100 mesh and containing 1%, by weight, of weakly magnetic impurities, is introduced to the magnetic separator described in Example IV.

The magnetic field employed has a mean maximum field intensity of 2 webers per square meter, a field gradient of 35 webers per square meter per meter, and the rotating magnetic components of the field have a mean speed of rotation of 377 radians per second.

A titanium ore is obtained which comprises 0.2%, by weight, of weakly magnetic impurities.

EXAMPLE XIII

A titanium ore having a particle size less than 100 mesh and containing 0.6%, by weight, of weakly magnetic impurities, is introduced to the magnetic separator described in Example IV.

The magnetic field employed has a mean maximum field intensity of 2 webers per square meter, a field gradient of 40 webers per square meter per meter, and the rotating magnetic components of the field have a mean speed of rotation of 159 radians per second.

A titanium ore is obtained which comprises 0.2%, by weight, of weakly magnetic impurities.

The data of the above examples is tabulated in the following table.

Table I

| Example | Feed | | Magnetic Field | | |
|---|---|---|---|---|---|
| | Magnetic Properties Magnetic Material | Iron, percent by wt. | Mean Max. Field Intensity, W./m.² | Field Gradient, W./m.²/m. | Radians per Sec. |
| III | Strongly magnetic | 93 | 0.3 | 1 | 7,650 |
| X | ___do___ | 0.08 | 0.7 | 13 | 2,262 |
| XI | ___do___ | 0.03 | 0.7 | 13 | 2,262 |
| II | Moderately magnetic | ¹11 | 0.7 | 7 | 2,262 |
| I | ___do___ | ¹18 | 1 | 10 | 377 |
| IV | ___do___ | ¹26 | (²) | 13 | 2,262 |
| V | ___do___ | ¹50 | (²) | 13 | 2,262 |
| VI | ___do___ | ¹70 | 0.7-0.4 | 13-7 | 2,262 |
| VII | Weakly magnetic | ¹14 | 1.4 | 26 | 377 |
| VIII | ___do___ | ¹30 | 1.4 | 26 | 377 |
| IX | ___do___ | ¹58 | 1.4-1 | 26-19 | 2,262 |
| XII | ___do___ | ¹1 | 2 | 35 | 377 |
| XIII | ___do___ | ¹0.6 | 2 | 40 | 159 |

¹ Expressed as Fe₂O₃.
² 60% of mean coercive force of magnetic particles.

I claim:

1. A method for the kinetic separation of non-magnetic particles from ferromagnetic particles in a mixture of said particles, substantially all of which particles have a particle size below about 100 mesh, which comprises introducing said mixture to a rotating magnetic field moving in a predetermined direction and which decreases in mean field intensity with distance from a region of maximum field intensity adjacent a non-magnetic surface, said mean maximum field intensity being at least 20 percent of the mean coercive force of said ferromagnetic particles and less than about 2 webers per square meter, said decrease in mean field intensity with distance being from about 0.3 to about 40 webers per square meter per meter, the lines of flux at substantially each point in at least a portion of said magnetic field varying in direction with time, said variation in direction of said lines of flux comprising a magnetic component rotating about each of said points at a mean speed of from about 150 to about 10,000 radians per second, said rotating magnetic components imparting to said ferromagnetic particles a translational motion opposite to the direction of translation of said magnetic field, and an angular velocity, which is converted in part to random translational velocity by collision of said ferromagnetic particles with each other and with non-magnetic particles, whereby said mixture of particles is expanded and the distance between particles is great as compared to the size of the particles and the particles are in turbulent motion, said mixture of particles constituting a pseudo gas, the linear velocity of said non-magnetic particles carrying them beyond and away from said ferromagnetic particles retained in said magnetic field by said change in field intensity with distance and being transported along said non-magnetic surface in essentially a common direction opposite to the direction of translation of said magnetic field by the net rotation in essentially a common direction imparted to said ferromagnetic particles by said rotating magnetic components and collision of said ferromagnetic particles with said non-magnetic surface.

2. A method for the kinetic separation of non-magnetic particles from ferromagnetic particles in a mixture of said particles, substantially all of which particles have a particle size below about 100 mesh and at least a major portion of which particles have a particle size below about 200 mesh, which comprises introducing said mixture to a rotating magnetic field moving in a predetermined direction and which decreases in mean field intensity with distance from a region of maximum field intensity adjacent a non-magnetic surface, said mean maximum field intensity being from about 40 percent to about 80 percent of the mean coercive force of said ferromagnetic particles, said decrease in mean field intensity with distance being from about 1 to about 5 webers per square meter per meter, the lines of flux at substantially each point in at least a portion of said magnetic field varying in direction with time, said variation in direction of said lines of flux comprising a magnetic component rotating about each of said points at a mean speed of from about 300 to about 4,000 radians per second, said rotating magnetic components imparting to said ferromagnetic particles a translational motion opposite to the direction of translation of said magnetic field, and an angular velocity, which is converted in part to random translational velocity by collision of said ferromagnetic particles with each other and with non-magnetic particles, whereby said mixture of particles is expanded and the distance between particles is great as compared to the size of the particles and the particles are in turbulent motion, said mixture of particles constituting a pseudo gas, the linear velocity of said non-magnetic particles carrying them beyond and away from said ferromagnetic particles retained in said magnetic field by said change in field intensity with distance and being transported along said non-magnetic surface in essentially a common direction opposite to the direction of translation of said magnetic field by the net rotation in essentially a common direction imparted to said ferromagnetic particles by said rotating magnetic components and collision of said ferromagnetic particles with said non-magnetic surface.

3. A continuous method for the kinetic separation of non-magnetic particles from ferromagnetic particles in a mixture of said particles, substantially all of which particles have a particle size below about 100 mesh, which comprises continuously introducing said mixture to a rotating magnetic field moving in a predetermined direction which decreases in mean field intensity with distance from a region of maximum field intensity adjacent a non-magnetic surface, said mean maximum field intensity being at least about 20 percent of the mean coercive force of said ferromagnetic particles and less than about 2 webers per square meter, said decrease in mean field intensity with distance being from about 0.3 to about 40 webers per square meter per meter, the lines of flux at substantially each point in at least a portion of said magnetic field varying in direction with time, said variation in direction of said lines of flux comprising a magnetic component rotating about each of said points at a mean speed of from about 150 to about 10,000 radians per second, said rotating magnetic components imparting to said ferromagnetic particles a translation motion opposite to the direction of translation of said magnetic field, and an angular velocity, which is converted in part to random translational velocity by collision of said ferromagnetic particles with each other and with non-magnetic particles, whereby said mixture of particles is expanded and the distance between particles is great as compared to the size of the particles and the particles are in turbulent motion, said mixture of particles constituting a psuedo gas, the linear velocity of said non-magnetic particles carrying them to a collection zone beyond and away from said ferromagnetic particles retained in said magnetic field by said change in field intensity with distance and being transported along said non-magnetic surface in essentially a common direction opposite to the direction of translation of said magnetic field to a collection zone by the net rotation in essentially a common direction imparted to said ferromagnetic particles by said rotating magnetic components and collision of said ferromagnetic particles with said non-magnetic surface, and continuously collecting said non-magnetic particles and said ferromagnetic particles thereby separated from each other.

4. The method of claim 1 wherein the mean speed of rotation of said rotating magnetic components is from about 300 to about 4000 radians per second.

5. The method of claim 1 wherein said mean maximum field intensity is from about 40 to about 80 percent of the mean magnetic force necessary for magnetic saturation of said ferromagnetic particles.

6. The method of claim 1 wherein said decrease in mean intensity with distance from a region of maximum intensity is from about 1 to about 5 webers per square meter per meter.

7. The method of claim 1 wherein the mixture treated comprises fly ash.

8. The method of claim 2 wherein the mixture treated comprises fly ash.

9. The method of claim 3 wherein the mean speed of rotation of said rotating magnetic components is from about 300 to about 4000 radians per second.

10. The method of claim 3 wherein said mean maximum field intensity is from about 40 to about 80 percent of the mean magnetic force necessary for magnetic saturation of said ferromagnetic particles.

11. The method of claim 3 wherein said decrease in mean intensity from a region of maximum intensity is about 1 weber per square meter per meter.

12. The method of claim 3 wherein a major portion of said particles has a particle size below about 200 mesh.

13. The method of claim 3 wherein the mixture treated comprises fly ash.

References Cited in the file of this patent

Engineering and Mining Journal, Volume 152, Issue 10, October 1951, pages 82, 83 and 118.

UNITED STATES PATENT OFFICE
CERTIFICATION OF CORRECTION

Patent No. 2,975,897

March 21, 1961

Cyril Presgrave

It is hereby certified that error appears in the above numbered patent requiring correction and that the said Letters Patent should read as corrected below.

In the grant, lines 2 and 12, and in the heading to the printed specification, lines 4 and 5, name of assignee, for "G. & W. H. Carson, Incorporated", each occurrence, read -- G. & W. H. Corson, Incorporated --; column 13, line 35, for "means" read -- mean --; column 16, line 50, for "translation" read -- translational --.

Signed and sealed this 15th day of August 1961.

(SEAL)
Attest:

ERNEST W. SWIDER
Attesting Officer

DAVID L. LADD
Commissioner of Patents